June 13, 1967  H. E. COOPER III  3,325,156
HOT MELT ADHESIVE APPLICATOR AND METHOD OF MELTING
Filed Jan. 10, 1964  7 Sheets-Sheet 1

Henry E. Cooper, III
Inventor
by Porter & Meyer
Attorney

June 13, 1967 H. E. COOPER III 3,325,156
HOT MELT ADHESIVE APPLICATOR AND METHOD OF MELTING
Filed Jan. 10, 1964 7 Sheets-Sheet 3

Henry E. Cooper, III
Inventor
by Porter & Meyer
Attorney

June 13, 1967 H. E. COOPER III 3,325,156
HOT MELT ADHESIVE APPLICATOR AND METHOD OF MELTING
Filed Jan. 10, 1964 7 Sheets-Sheet 5

FIG. 5

Henry E. Cooper, III
Inventor
by Porter & Meyer
Attorney

United States Patent Office 3,325,156
Patented June 13, 1967

3,325,156
HOT MELT ADHESIVE APPLICATOR AND
METHOD OF MELTING
Henry E. Cooper III, Waltham, Mass., assignor to The Terrell Corporation, Wilmington, Mass., a corporation of Massachusetts
Filed Jan. 10, 1964, Ser. No. 337,075
11 Claims. (Cl. 263—11)

This invention relates to a method and a means for preparing for application hot melt compositions for use as adhesives, sealers, coatings, and the like.

Hot melt adhesives are widely used for joining metal parts (e.g. as side seam cement for metal cans), paper parts (e.g. to fill the butts in spiral wound composite containers), leather parts (e.g. as shoe adhesives) and the like. Such adhesives are formulated from thermoplastic resinous masses having an initial softening temperature in excess of the temperature to which the adhered parts will normally be exposed in service, and which when molten are viscous and tacky. Such materials as certain polyamides or modified polyamides, certain polyesters or modified polyesters, and certain ethylene-vinyl acetate copolymers are widely used in such hot melt adhesives. A typical butt filling compound for spiral wound composite containers might have a ball and ring softening range of 225 to 235° F., a molten viscosity of 1800 to 2800 cps. at 300° F. and an application temperature of 340 to 350° F. A typical side seam cement might have a ball and ring softening temperature of 250 to 260° F., a viscosity of 800 to 1000 cps. at 360° F. and an application temperature of 360° to 380° F.

The heating of such resinous masses to the application temperature has already posed certain difficulties especially since such materials are subject to various types of thermal degradation, especially when maintained at elevated temperatures for extended periods. Such degradation is a time temperature function with the rate of degradation increasing greatly with temperature, probably doubling for each 10° C. increase in temperature. One of the types of degradation that occurs frequently and is difficult to control by formulation is thermal-oxidative in nature and, depending on the types of resins involved, may result in extreme darkening, surface gelation, or formation of a dark, tough skin on the surface of the molten material when such molten surface is exposed to oxygen as in air. The rate of formation of such skin or other degradation products is relatively rapid when the material exposed to the air is maintained at the application temperature. Other types of degradation involving the formation of an irreversible gel or of a sludge or char, or thermal de-polymerization of resins, or separation of mixtures of resins, waxes and the like into the separate components, occur when the material is exposed to temperatures much in excess of the application temperature, even in absence of surface exposure to oxygen. This second type of degradation coupled with the fact that a typical material, even when molten, is relatively plastic and stringy and, under any circumstance, is a relatively poor conductor of heat limits the use of rapid heating by direct contact as a means to avoid any kind of time-temperature degradation.

Such degradation is becoming more of a problem as the hot melt art develops. The newer adhesives tend to have a higher strength and a higher service temperature. Such adhesives necessarily have a higher inherent viscosity which requires that the application temperature be raised correspondingly in order to achieve the low viscosity required for application.

There are two conventional ways for handling such materials. The most common means is to heat a mass of material to the application temperature in a tank and to apply the material from this tank either by means of a roll partially immersed in the surface of the molten material, or to apply by nozzles supplied by circulating pumps. In order to avoid gelation and charring the rate of heating necessarily must be slow, and as a result is necessary to maintain a relatively large mass of material at application temperature. This condition favors thermal-oxidative degradation such as the formation of skin. Alternative means have been developed to feed small quantities of material, generally in the form of rods or slugs to an enclosed heated zone where small quantities of the material are heated rapidly and are immediately ejected through an application nozzle. In such instances the heated zone must be maintained with a wall temperature substantially in excess of the application temperature to insure complete melting of the material contained therein. This leads to gelling or charring of the material if for any reason the material is not ejected from the heated zone promptly. Considering the need for prompt heating and melting and the inherently poor heat conductivity of the resinous materials involved, this method is limited to rods or slugs of small cross-section and thus relatively small volume outputs of molten adhesives. These difficulties in handling the molten material have been a serious limitation to the widespread adoption of hot melt adhesive compositions for industrial use.

It is the object of this invention to provide a means for heating hot melt adhesive compositions wherein these problems inherent in the prior art are overcome by maintaining the material exposed to the air at a relatively low temperature at which the material is only barely mobile, and by maintaining the material which is at application temperature out of contact with the air. A further object is to provide means whereby only a limited portion of the material is heated to application temperature and in such manner that no material is ever exposed to an excessively hot surface. A further object is to provide an adequate supply of uniformly heated material for acceptance and discharge by a delivery metering pump, whether such delivery is intermittent or continuous. Preferably these objects are accomplished by providing for an orderly increase in the temperature of the materials as they progress through the system while maintaining at a minimum temperature the material which is exposed to the air. More specifically the exposed material which is continuously renewed as an equal portion of material is removed from the system is maintained in a semi-molten condition at a temperature which is from 80 to 100° F. or even more below the application temperature.

Referring to the drawings and especially to FIGS. 1 through 5 thereof, the hot melt adhesive applicator of the present invention comprises a generally rectangular tank 21 formed as by casting of a metal having a high degree of thermal conductivity such as aluminum and provided with a relatively thick bottom section 22 and relatively thin integrally formed walls 23, 24, 25 and 26. The exterior of tank 21 is provided with a layer 27 of thermal insulating material which covers the bottom and the walls and extends nearly, but not quite, to the top of the walls. Lagging layer 27 is provided sufficiently thick to effectively prevent any substantial heat loss through the bottom or the walls.

Tank 21 is divided into three sections by substantially horizontal baffles indicated generally at 28 and 29. Upper baffle 28 comprises a plate section 31 and a strainer section 32. The space above baffle 28 comprises a resin receiving zone indicated generally at 33. Lower baffle 29 is mounted in close proximity to the upper surface 34 of bottom 22 of tank 21. The space between baffle 29 and surface 34 of bottom 22 comprises a heat exchanging zone indicated generally at 35 and the space between baffle 29 and baffle 28 comprises a material storage zone indicated generally at 36. Two or more pumps indicated generally at 37 and 38 are provided. Circulating pump 37 draws material from storage zone 36 and forces it through heat exchanging zone 35. Delivery pump 38 draws molten material from well 39 provided in heat exchanging zone 35 and delivers such material to an applicator nozzle (not shown) as indicated by delivery tube 41. More than one pump 38 may be provided if more than one applicator nozzle is desired though only one is shown. Likewise more than one nozzle may be supplied from a single pump 38.

Figure 2:
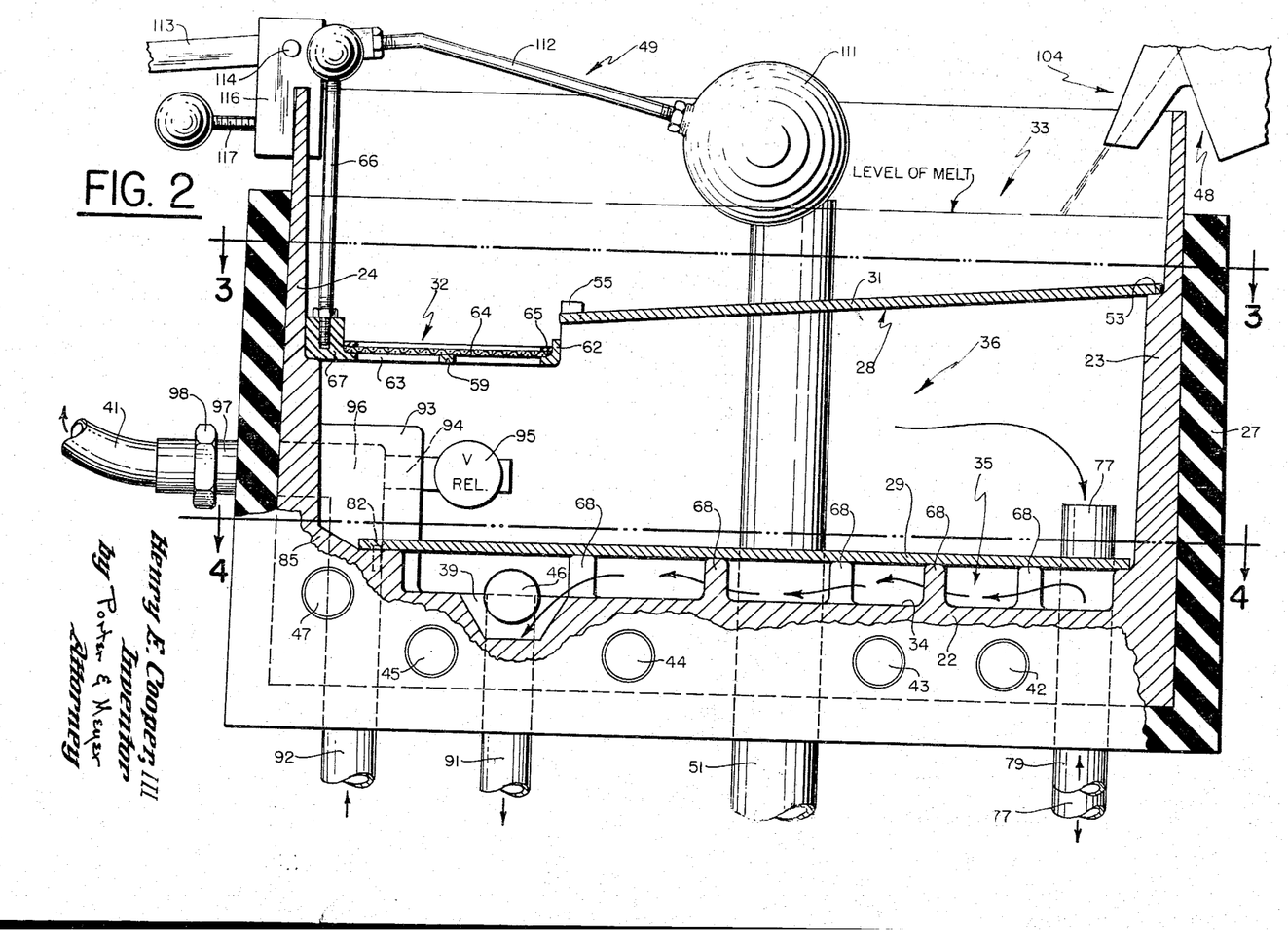
FIG. 2 is a side elevation in section along line 2—2 of FIG. 3.
Figure 5:
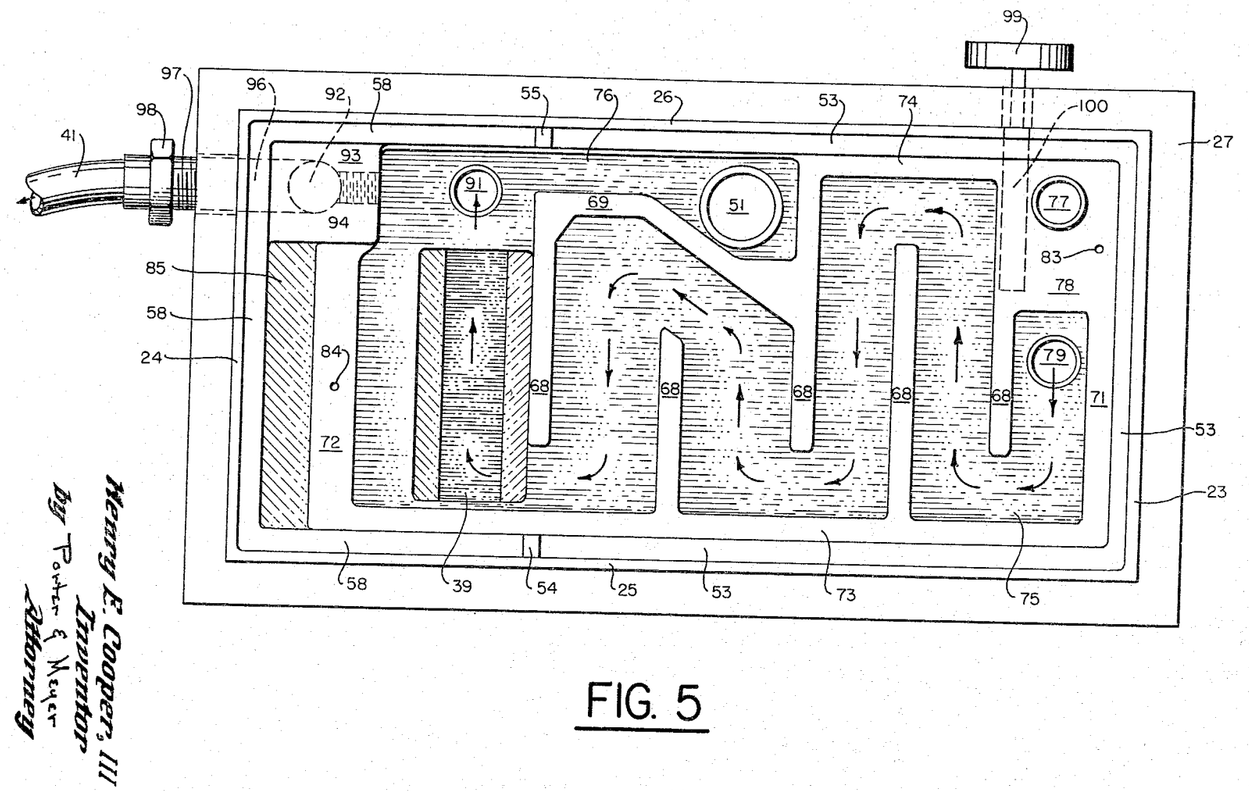
FIG. 5 is a top view with the upper and lower baffle plates removed.
Figure 8:
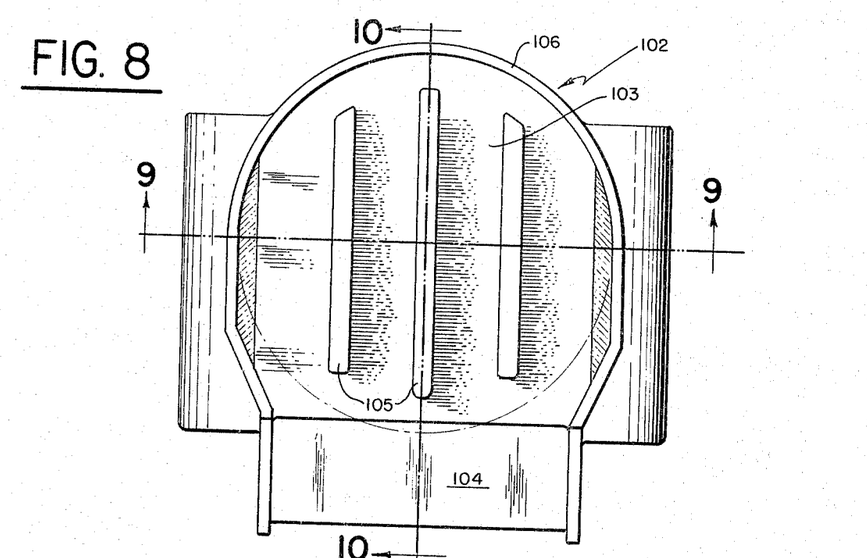
FIG. 8 is a top view of the preferred means for supplying adhesive.
Figure 9:
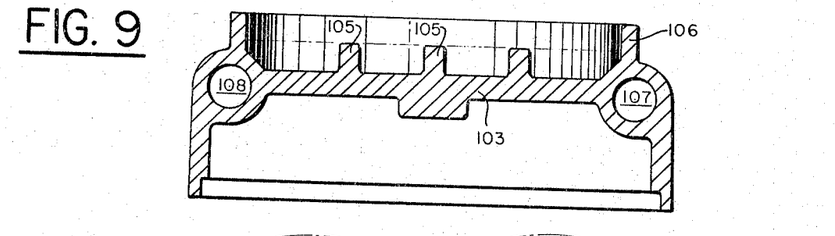
FIG. 9 is an elevation in section along line 9—9 of FIG. 8.
Figure 10:
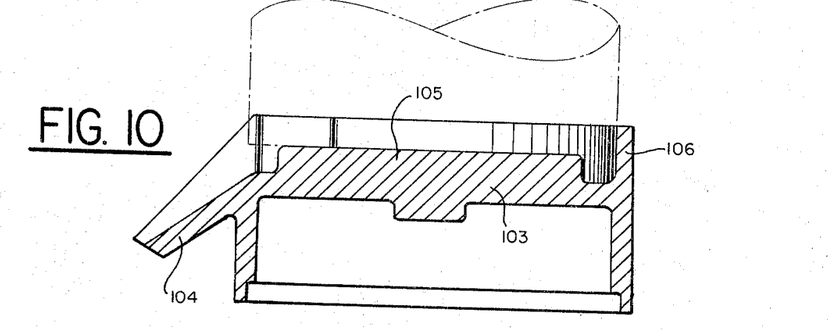
FIG. 10 is an elevation in section along line 10—10 of FIG. 8.

The bottom 22 of tank 21 is provided with a plurality of horizontal internal recesses indicated at 42, 43, 44 and 45 to receive heater elements and means are provided as indicated generally at 46, 47 to mount two thermostats, one in well 39 and the other in bottom 22. If desired automatic means may be provided for adding resin to tank 21. Such means includes a heated melting plate indicated at 48 and level control means indicated generally at 49. An overflow drain 51 mounted in and passing through bottom 22 and extending to a height greater than the maximum normal adhesive level, but lower than the upper extent of the walls of tank 21 may be provided to drain excess resin out of tank 21 in the event of some malfunction.

Figure 3:
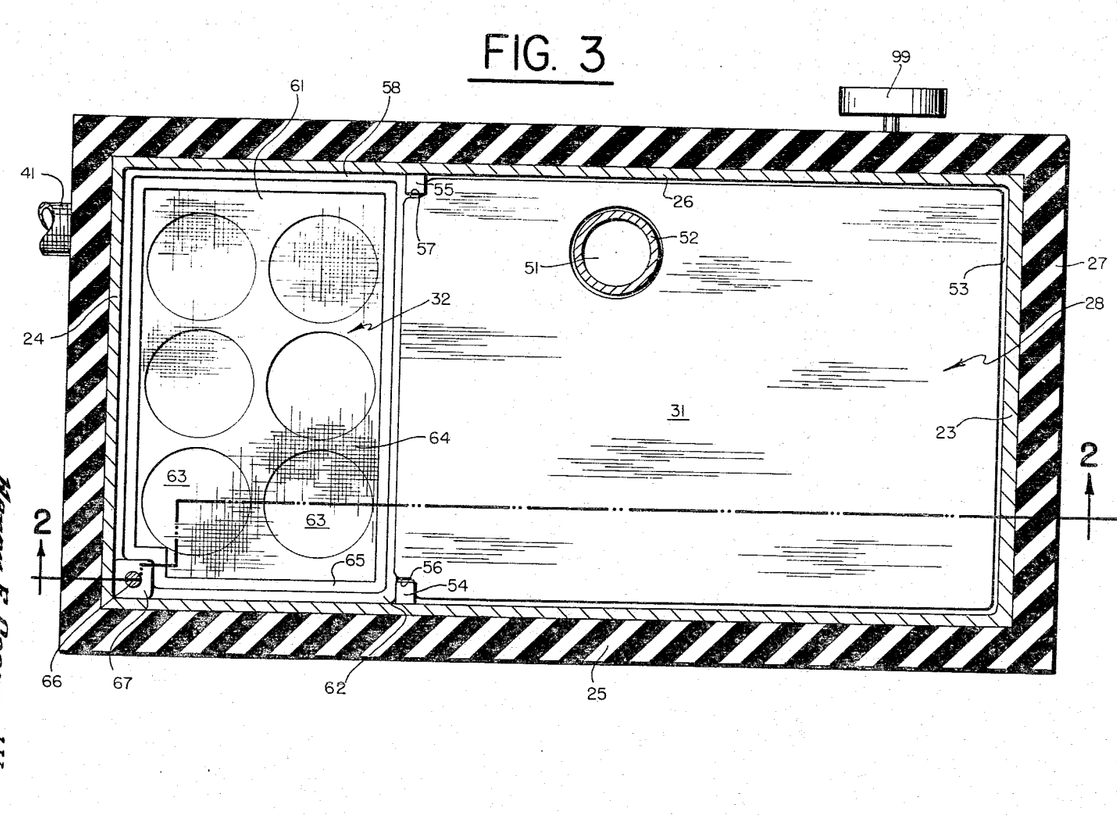
FIG. 3 is a top view in section along line 3—3 of FIG. 2.

The most important element in the resin melting system is the provision of a resin receiving zone 33 which is physically separated by baffle 28 from the remainder of the tank which, since it overlies the molten resin in the body of the tank, protects that molten resin from any contact with the air. The provision of such a zone alone has proven to be sufficient to eliminate most skin formation. Baffle 28, as explained above, comprises plate section 31 and strainer section 32. Plate section 31 is a generally rectangular plate provided with an aperture 52 adapted to permit the passage therethrough of overflow drain pipe 51. Plate 31 is supported on a shelf 53 provided for that purpose in the walls 23, 25 and 26 of the casting which comprises tank 21. Shelf 53 may if so desired be so formed that the edge of plate 31 adjacent to wall 23 is higher than the edge of plate 31 adjacent strainer section 32. A difference in height of about one-half inch in seven inches has proven to provide a satisfactory slope in such instances. Shelf 53 on side walls 25 and 26 terminates in a pair of upstanding stops 54 and 55 adapted to cooperate with notches 56 and 57 provided in the lower end of plate 31 to maintain the plate 31 in place with its other edge adjacent to end wall 23.

The strainer section 32 is supported in a horizontal shelf 58 provided in walls 24, 25 and 26 in such position that the upper portion of the outer edge of strainer section 32 (i.e. the edge away from wall 24) lies about ¼ or ½ inch or so below the outer end of chute plate 31. Strainer section 32 comprises a plate 59 provided with a flat central panel 61 and upstanding wall 62 about its periphery. Panel 61 is provided with a plurality of apertures 63. A metal screen 64 is provided to overlie panel 61. Screen 64 is held in place by bezel 65 adapted to cooperate with wall 62. An upstanding handle 66 mounted in a stub 67 provided on plate 59 and extending above the top of tank 21 may be provided to facilitate the removal of strainer section 32.

Walls 23, 24, 25 and 26 of tank 21 are notably thicker below shelves 53 and 58 and increase slightly inward toward bottom 22. Bottom 22 of the casting comprising tank 21 is relatively thick (one inch to one and one-half inches or more) to insure uniform heat distribution and a uniform temperature at upper surface 34 of bottom 22. A plurality of upstanding transverse ribs 68 are provided on the upper inner surface 34 of bottom 22. Ribs 68 are of the uniform height generally about one-half inch or so and, together with longitudinal rib 69 and inner wall extensions 71, 72, 73 and 74, form a base for lower baffle plate 29. Ribs 68 extends alternately from side wall extension 74 and from rib 69 on the one side and from side wall extension 73 on the other side to form a labyrinth passage 75 for the passage of molten resin between plate 29 and the top surface 34 of bottom 22.

Labyrinth passage 75 terminates in well 39, a transverse depression in bottom 22 located generally beneath strainer section 32 of upper baffle 28, and extending from front wall 25 to a position just short of the location of longitudinal rib 69. Longitudinal rib extends generally parallel to rear wall 26 from its intersection with the transverse rib 68 next adjacent wall 39 toward the next transverse rib 68 extending from back wall 26 passing around overflow drain 51. The front wall of longitudinal rib 69 forms the rear wall for labyrinth passage 75, while its rear wall (which passes in front of drain pipe 51) constitutes the lower wall of resin return passage 76.

Figure 4:
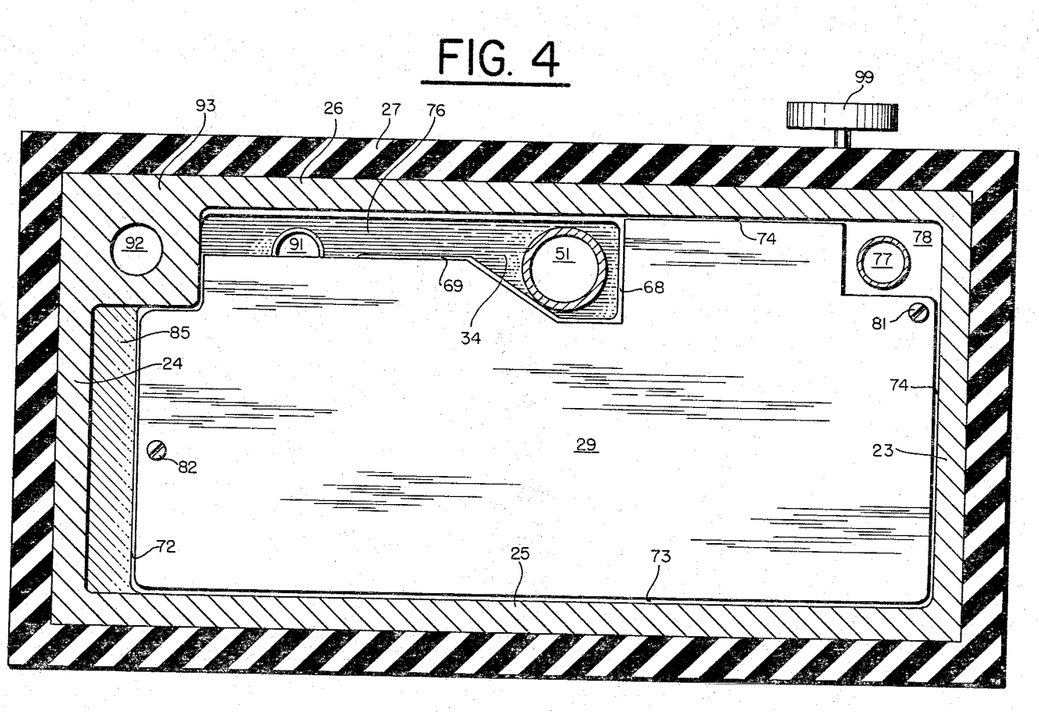
FIG. 4 is a top view in section along line 4—4 of FIG. 2.

Inlet pipe 77 for circulating pump 37 located near the intersection of wall 23 with wall 26 extends through bottom 22 of tank 21 and terminates in the material storage zone 36 at a level slightly above the level of rear baffle 29. Inner wall extension 71 and inner wall extension 74 are further extended at their intersections to form a plateau indicated at 78 surrounding inlet pipe 77. Outlet pipe 79 for circulating pump 37 extends through bottom 22 and terminates in labyrinth passage 75 between inner wall extension 71 and the first transverse rib 58. Lower baffle plate 29 extends over the bottom of tank 21 covering the entire labyrinth passage 75 and well portion 39. The portion of baffle plate 29 at the right rear corner is cut away to permit passage of inlet pipe 77 into material storage zone 36 and a portion along the rear on the left hand side is cut away along the line of longitudinal rib 69 and extending toward inner wall extension 72 forming the aperture for resin return passage 76. Lower baffle plate 29 is firmly fastened into contact with ribs 68, rib 69, inner wall extension 71, 72, 73 and 74 and plateau 78 by means of suitable fasteners indicated by screws 81 and 82 to cooperate with tapped holes 83 and 84 respectively. Thus the resinous material is drawn from material storage zone 36 by means of inlet pipe 77 for circulating pump 37, passes through the pump 37 which preferably is a positive displacement pump of considerable capacity and is forced into one end of labyrinth passage 75 through outlet pipe 79. The material passes through labyrinth passage 75 between upper surface 34 of bottom 22 and lower baffle plate 29 into wall 39. The material then passes out of wall 39 through a resin return passage 75, back into material storage zone 36, and back to inlet 77 of circulating pump.

Bottom 22 is provided with a plurality of internal transverse heater receiving recesses 42–45 each adapted to receive a suitable electric resistance heater. A thermostat to control the heaters in recesses 42–45 is inserted into well 39 through a suitable sealed aperture 46 in wall 25. A second thermostat is extended into transverse recess 47 located in second wall section 85 beyond inner wall extension 74. The thermostat in aperture 47 is sensitive to the temperature of bottom 22 and is adapted to disconnect the heaters in recesses 42–45 should a predetermined maximum temperature be exceeded. This prevents overheating of bottom 22. As mentioned above, bottom 22 is thick enough to insure uniform heat distribution from the heaters located in recesses 42–45 and a uniform temperature along inner surface 34 of bottom 22, and up into ribs.

Figure 11:
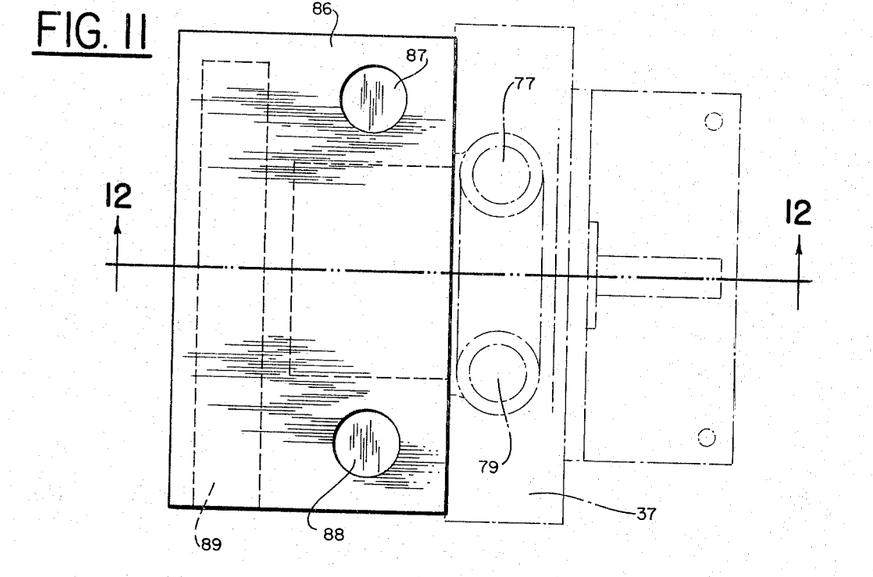
FIG. 11 is a top view of an optional means for heating the pumps associated with the hot melt adhesive applicator.
Figure 12:
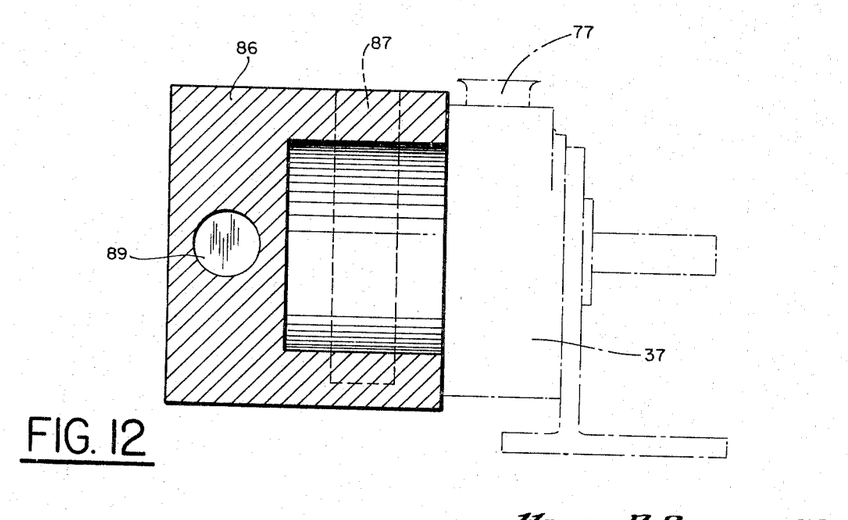
FIG. 12 is a side view in section corresponding to FIG. 11.

Inlet and outlet pipes 77 and 79 are suitably lagged and pump 37 may be provided with a separate heating means as indicated in FIGS. 11 and 12. As shown, the body of pump 37 (shown in broken lines) is surrounded by a mass 86 of a suitable metal, such as aluminum, which mass is provided with two recesses 87 and 88 adjacent the body of pump 37 to receive electrical resistance heaters, and a third recess 89 located beyond the body of pump 37 at right angles to recess at 87 and 88 to receive a thermostat for controlling the heaters in recesses 87 and 88.

Inlet pipe 91 for delivery pump 38 is located with its entrance on the upper surface 34 of bottom 22 adjacent to well 39 and passes through bottom 22 to pump 38. Outlet pipe 92 of pump 38 passes through bottom 22 into integrally cast housing 93 provided upstandingly of bottom 22 at the intersection of walls 24 and 26 and terminates in a T provided internally of housing 93. One arm of the T comprises tapped passage 94 which leads to a pressure relief valve 95 located inside tank 21 within the material storage zone 36. The other arm of the T comprises passage 96 to which is affixed coupling 97 and union 98 for affixing adhesive delivery tube 41 which leads to an adhesive delivery nozzle (not shown). Pipes 91 and 92 are suitably lagged and pump 38 may be provided with a heating means similar to that provided for pump 37. The return of outlet pipe 92 through integral housing 93 insures that the delivered resin will be maintained at the desired delivery temperature. Resin delivery tube 41 may be suitably heated in accordance with common practice in the art.

Pump 38 is preferably a positive displacement pump provided with speed regulating means so that its output may be adjusted to match the maximum normal rate of resin consumption through the nozzle. Any material delivered by pump 38 which for any reason may be in excess of that amount required by the nozzle is returned to material storage zone 36 through pressure relief valve 95. Pump 38 may be fitted to supply more than one nozzle or a duplicate assembly including pump 38 and housing 93 may be provided for additional nozzles. The pumping rate of pump 37 is adjusted to be at least two times, and preferably a higher value up to ten times, the pumping rate of pump 38 (or if there is more than one pump 38 the combined pumping rate of pumps 38) in order to insure that the amount of material recirculated through heat exchanging zone 35 exceeds the amount withdrawn by means of pump 38.

A conventional thermometer such as dial thermometer 99 may be provided in a suitable recess 100 provided in some suitable portion of bottom 22 of tank 21 to give visual indication of the temperature of the base portion of the casting.

As mentioned above, an automatic resin delivery system may be provided for feeding fresh resin to the melting tank. A typical such system suitable for use with bar form adhesive includes a heated delivery plate 48 and a level control means 49 shown in FIGS. 1, 2 and 6–10. Heated delivery plate 48 comprises a casting 102 having a body portion 103 and a spout portion 104 adapted to be mounted with the spout 104 passing over the top of one of the walls of tank 21. Body portion 103 is provided with a plurality of upstanding ribs 105 and a raised wall 106. Wall 106 is dimensioned to receive one end of a cylinder of solid resin composition. Two recesses 107 and 108 are provided in body portion 103 to receive thermostatic control devices and a suitable resistance heater (not shown) is affixed to the bottom of body portion 103. Preferably heated delivery plate 48 is so arranged that spout 104 overhangs the wall of tank 21 adjacent the high side of chute plate 31. A plurality of heating plates 48 may be employed. A plurality of rods (not shown) arranged normal to spout portion 103 may be provided to support the cylinder of solid resin compositions.

Figures 1, 6, 7:
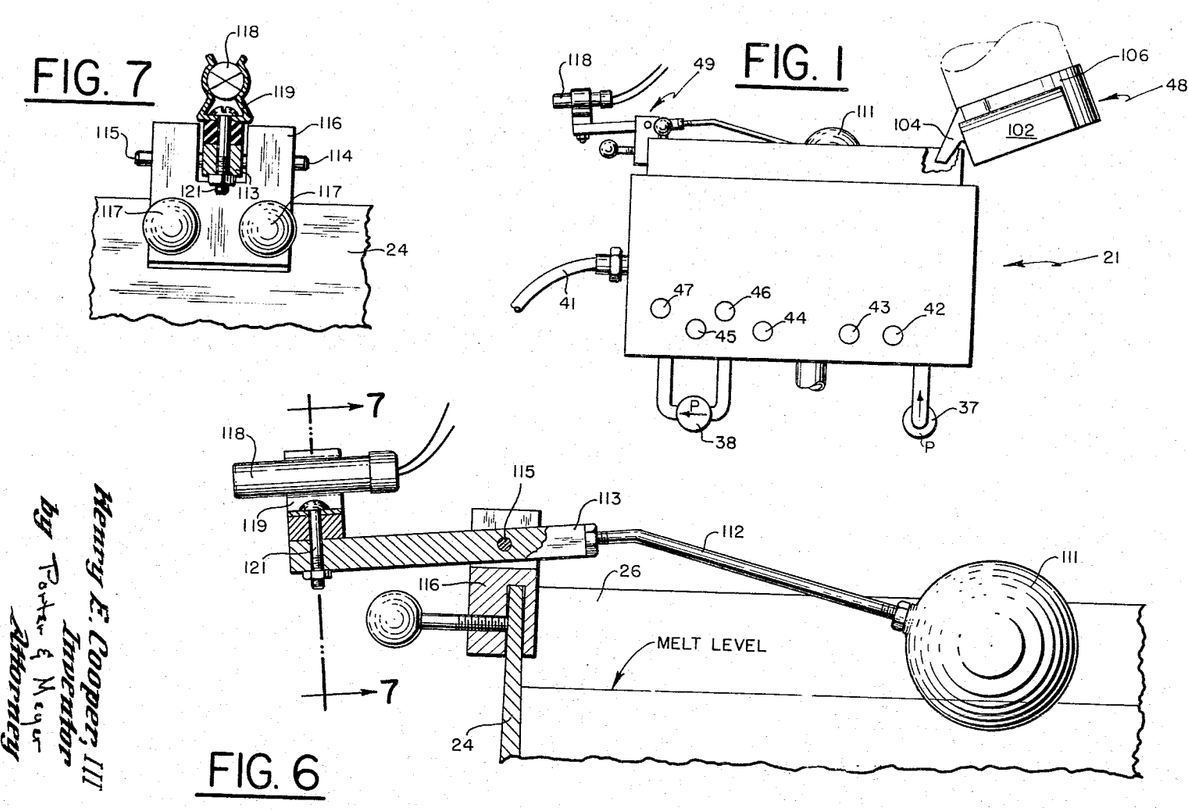
FIG. 1 is a side elevation showing the general arrangement of the hot melt adhesive applicator of the present invention.
FIG. 6 is the side view partially in section showing the adhesive level control means.
FIG. 7 is an end view partially in section corresponding to FIG. 6.

Level control mechanism 49 comprises a float 111, a float retaining rod 112, and a block portion 113. Block portion 113 is pivotally mounted at 114 and 115 to support block 116 which is adapted to be mounted on the upper edge of one of the sides of tank 21 and to be retained in place by a set screw 117. On the end of block 113 opposite float 111 there is mounted a mercury switch 118 supported in a suitable clamp 119 which is fastened to block 117 by a bolt 121.

In use a bar (or block, pieces, or granules) of solid resin composition is placed on body 103 of delivery plate 48 with its bottom resting on the top of ribs 105. As the adhesive level in tank 21 drops float 111 also drops ultimately tipping the mercury switch 118 into contact position. This actuates the heater attached to underside of body 103 raising the temperature of body 103 of delivery plate 48 to a temperature as controlled by thermostatic device inserted in recess 107, at which temperature the resin resting on rib 105 becomes fluid. The melted resin then passes down heated spout 104 into tank 21. As soon as the level in the tank reaches the predetermined level float 111 rises causing switch 118 to assume a non-contacting position. This in effect turns off the heater permitting the temperature of heater delivery plate 48 to drop below the melting point of the resin and halting the flow of fresh resin into tank 21. In order to provide for prompt melting action when next called for by the float switch 118, the delivery plate 48 is now maintained hot, but at a lower temperature range as controlled by thermostat device inserted into recess 108. In other words, the heater is modulated by level float 111 and switch 118 between a low heat range which maintains delivery plate 48 at a temperature slightly below the melting point of the resin, and a high heat range at which melting action occurs.

Taking as a typical example a hot melt resinous adhesive composition having a ball and ring melting point of 225° F. and a desired application temperature of 360° F. the apparatus is adjusted to operate in the following manner. Heated delivery plate 48 is set to maintain a normal temperature of about 195° F. and a high temperature of about 300° F. Under these conditions during the melting cycle the semi-fluid semi-gelatinous material dropping off of spout 104 has an average temperature of about 260 to 265° F. At this temperature the material is just barely mobile. This material falls onto plate section 31 of upper baffle 28 at a point adjacent wall 23, and gradually slides across the surface of plate 31 toward strainer section 32 as material passes through strainer section 32 from resin receiving zone 33 into material storage zone 36. This action which takes place whether or not plate 31 is inclined, continuously reheats the material exposed to the air. The composition in the resin receiving zone 33 not in contact with screen section 32 is heated only by contact with the walls of the tank 21 which at this point are relatively thin, being above shelves 53 and 58 and by contact with plate 31 which in turn is in contact with the material in material storage zone 36. It will be noted that lagging 27 is terminated at approximately the desired adhesive level permitting the heat in the walls of tank 21 above this point to be radiated in either direction. The height of lagging 27 can be varied if necessary to adjust the temperature of the material in material receiving zone 33 to keep material in this zone just barely mobile. Under the conditions of this example the temperature of plate 31 is about 270° F. and therefore the layer of material in receiving zone 33 in contact with plate 31 is approximately this temperature. As mentioned above, the rate of heat conductivity of this type of material is relatively poor. As a result, especially if the passage of material across plate 31 is relatively slow, the temperature of the material on the upper surface exposed to the air tends to cool to a temperature somewhat lower than the 260–265° F. at which it enters receiving zone 33. However, because the walls and plate 31 are heated to a temperature at which the material flows the cooling does not interfere with the gradual movement of material from one end to plate 31 to the other. The relatively low temperature of the surface of the material exposed to air because of the stratification imposed by upper baffle 28 effectively prevents any thermal decomposition of this material.

Ultimately as the material is used up from the system the bit of material under consideration falls onto screen 64 of strainer section 32. At this point is comes into direct contact both with plate 59 of strainer section 32 which because of its mass connects heat readily across screen section 32 from the adjoining wall and with material in material storage zone 36 which, as mentioned above, because of the fact that all of the heat is introduced at the bottom, and because of the fact that all of the heat loss is through the top, is maintained at a temperature of about 270° F. at the top. At this temperature the material, while still very viscous is fluid enough to pass through the screen as the material beneath is used up. The surface temperature of bottom 22 is maintained at a temperature of between 350 and 360° F., the delivery temperature. Because of the relatively efficient heat transfer from the surface 34 of bottom 22 and from ribs 68 the material forced through heat exchanging zone 35 by pump 37 is rapidly heated to this temperature. The excess material over that withdrawn from the system by delivery pump 38 passes from heat exchanger zone 35 back into material storage zone 36 through resin return passage 76. Because of the rapid decrease in viscosity with increase in temperature this material at 350–360° F. tends to form a separate strata that passes directly over the surface of lower baffle plate 29 back to the entrance of inlet pipe 77 of pump 37 tending to entrain only so much of the cooler material in the strata above as is necessary to make up for the loss of material from the system due to the discharge of such material through the pump 38. Any material returned to material storage zone 36 through relief valve 95 since such material is at the relatively fluid application temperature tends to rejoin the relatively fluid material in the strata adjacent baffle plate 29. As a result there is very little mixing of material in material storage zone 36, but rather the make-up material tends to move gradually from strainer section 32 to the inlet of pipe 77 as a unit. The lack of mixing because material is heated in a separated heat exchanging zone 35 and is recirculated only across the surface of baffle plate 29 explains the fact that under operating conditions there is a 50–60° F. temperature difference between the material in material storage zone 36 adjacent baffle plate 28 and the material in that zone adjacent baffle plate 29.

To start up the apparatus initially, chute plate 31 and strainer section 32 are removed and the apparatus is filled to the desired level with molten resin. Thereafter chute plate 31 and strainer section 32 are laid into place on shelves 53 and 58 respectively.

I claim:

1. An applicator for a hot melt resinous composition, comprising a tank of substantial depth for receiving said composition, means for heating the bottom of said tank to the application temperature of said composition, means for withdrawing molten composition from the body of said tank adjacent said bottom, and means for preventing thermal oxidative degradation at the surface of said composition said means including a substantially horizontal, impervious baffle plate having a limited apertured portion extending across said tank, at a position remote from said bottom and slightly below the normal surface level of said composition.

2. An adhesive applicator as claimed in claim 1 wherein said apertured portion is provided with a screen.

3. An applicator for a hot melt resinous adhesive composition comprising a tank of substantial depth for receiving a quantity of said composition, heater means located within the base of said tank for heating said base to the application temperature of said composition, two substantially horizontal baffles arranged within said tank at levels normally covered by said composition and extending across said tank, the first said baffle comprising an impervious plate portion and a limited apertured portion located slightly below the normal surface level of said composition and forming a resin receiving zone in said tank above the upper surface thereof, the second said baffle located slightly above the bottom of said tank and forming a heat exchanger zone between said second baffle and the bottom of said tank, and pump means for withdrawing said composition from above said second baffle and passing said composition through said heat exchanger zone and for withdrawing said composition from said heat exchanger zone and delivering said composition to an applying means.

4. An adhesive applicator as claimed in claim 3 wherein the heat exchanger zone between the bottom of said tank and said second baffle is provided with a plurality of upstanding wall portions, said wall portions arranged to form a labyrinth passage.

5. An adhesive applicator as claimed in claim 4 wherein said pump means comprises a circulating pump means arranged to deliver said composition to one end of said labyrinth passage and a delivery pump means arranged to withdraw composition from the other end of said labyrinth passage.

6. An adhesive applicator as claimed in claim 5 wherein means are provided for delivering composition in a semi-molten condition at a temperature substantially below said application temperature to said resin receiving zone above said first baffle.

7. An adhesive applicator as claimed in claim 6 wherein said delivery means comprises a slanted plate overlying an edge of said tank and adapted to receive and retain thereon a mass of composition in solid form, heater means for heating said plate to a temperature above the melting point of said composition, and means responsive to the level of composition in said tank for actuating said heater means.

8. An adhesive applicator as claimed in claim 5 wherein said circulating pump means has a pumping rate substantially in excess of the pumping rate of said delivery pump means, and wherein a passage is provided for the return of excess composition from said heat exchanger zone to the region of said tank above said second baffle.

9. An adhesive applicator as claimed in claim 5 wherein a layer of heat insulating lagging is provided on the outside surface of the bottom and the sides of said tank.

10. An adhesive applicator is claimed in claim 9 wherein said heat insulating lagging extends up the sides of said tank only to a level substantially equal to the level of said composition, whereby heat is permitted to radiate from the side wall of the tank above the level of said lagging thereby reducing the temperature of this composition at even level.

11. A method for continuously heating a resinous hot melt adhesive composition to an elevated application temperature while preventing the formation of decomposition products at the interface of said composition with air which comprises providing a tank of substantial depth, placing in said tank a quantity of said composition sufficient to substantially fill said tank, applying heat to the bottom of said tank in amount sufficient to raise the temperature of that portion of said composition adjacent said bottom to said application temperature, interposing entirely across said tank a substantially horizontal composition stratifying barrier provided with a limited aperture at a level below the surface of said composition in said tank but remote from the bottom of said tank, continuously withdrawing molten composition from a level in said tank adjacent the bottom thereof and adding to said tank at a level above said barrier fresh composition at a temperature substantially below said application temperature in amount sufficient to maintain a substantially constant level of composition in said tank.

References Cited

UNITED STATES PATENTS

| | | | |
|---|---|---|---|
| 1,734,747 | 11/1929 | Seeley | 126—343.5 |
| 2,471,733 | 5/1949 | Fiduccia | 126—343.5 |
| 2,544,661 | 3/1951 | Fossa | 126—343.5 |
| 2,872,916 | 2/1959 | Paulsen | 126—343.5 |
| 3,012,373 | 12/1961 | Willis | 137—386 X |
| 3,089,939 | 5/1963 | Dunlap et al. | 126—343.5 |
| 3,189,022 | 6/1965 | Melsky | 126—343.5 |

FOREIGN PATENTS 675,287   7/1952   Great Britain.

FREDERICK L. MATTESON, JR., *Primary Examiner.*
JOHN J. CAMBY, *Examiner.*